(United States Patent Office)

2,749,336

PROCESS FOR PRODUCING CELLULOSE DERIVATIVES

Floyd L. Boddicker, Petersburg, and Paul E. Graybeal, Mansion Hills, Va., assignors to Hercules Powder Company, Wilmington, Del., a corporation of Delaware No Drawing. Application April 2, 1952,
Serial No. 280,168

13 Claims. (Cl. 260—231)

This invention relates to the production of cellulose ethers. In a specific aspect this invention relates to a method for producing carboxyalkyl cellulose derivatives and for adjusting the viscosity of said derivatives. In a more specific aspect this invention relates to a process for producing and regulating the viscosity of sodium carboxymethylcellulose.

Viscosity and degree of substitution are two of the major properties of a cellulose derivative, such as a cellulose ether, which determine its utility. The degree of substitution is largely determined by the ratio of etherifying reagents to cellulose and by the identity of the etherifying reagent. The viscosity of a cellulose ether has heretofore been regulated by a variety of procedures. One such procedure involves the use of a special cellulose having the requisite degree of polymerization to produce each viscosity type. This is highly undesirable since a special type of cellulose must be kept on hand for each viscosity type of cellulose ether that is desired to prepare. Furthermore, in the preparation of cellulose of a suitable low degree of polymerization there is generally a loss of some of the cellulose with a consequent increase in the production costs of the cellulose ether.

Another method of controlling the viscosity of a cellulose ether, such as carboxyalkyl derivatives of cellulose, involves the aging of the ether in the presence of air. In order to be effective, the aging must be carried out for a period of at least several hours and in some instances as long as two days. This is obviously disadvantageous because of the long period of time required for the degradation of the cellulose and the attendant slowing down of the process. Additionally, the exact control of time, temperature, caustic concentration, etc., required because of the sensitivity of cellulose to these influences is very difficult to attain and is frequently inadequate even under the best of conditions.

Another method involves the hydrolysis of the cellulose ethers by heating in the presence of acids and the addition of air or oxygen to the etherification reactor. Hydrolysis is undesirable since it results in the formation of products which are usually unstable, the acid treatment apparently removing certain stabilizing constituents of the cellulose ether. Addition of air or oxygen is quite effective, but it is of limited usefulness due to the fact that control of the viscosity is not good, i. e., it is difficult to obtain products of exactly the required viscosity.

The addition of hydrogen peroxide and the alkali metal hypobromites, hypochlorites, hypoiodites, peroxides or periodates to the etherification mix has been suggested, and the addition of such compounds gives good viscosity control in the so-called "dough" process in which cellulose is reacted with a carboxyalkyl etherifying agent in the presence of free alkali and water. However, in the slurry process for manufacturing cellulose ethers, such as carboxymethylcellulose and the like, involving the use in the reaction mixture of a diluent, for example, a low boiling aliphatic alcohol, such as isopropanol, it has generally been considered that the addition of such compounds to the reaction mixture does not produce the same degree of viscosity control as in the "dough" process. It has been confirmed that the addition of the above oxidizing agents, such as an alkali metal hypochlorite and the like, to a slurry reaction mixture containing isopropanol or other low boiling aliphatic alcohol is ineffective in controlling the viscosity of the etherified cellulose product unless the oxidizing agents are added to the reaction mixture in accordance with this invention.

It is an object of this invention to provide a novel procedure for producing cellulose derivatives.

It is another object of this invention to provide a novel slurry procedure for producing cellulose ethers.

It is a further object of this invention to provide a novel slurry procedure for producing carboxymethylcellulose and for controlling the viscosity of the product.

Further and additional objects of this invention will be apparent from the detailed disclosure hereinafter.

It has been found that an oxidizing agent, for example, sodium hypochlorite, can be employed in a process for producing cellulose ethers by the slurry procedure provided the oxidizing agent is added at a time prior to the addition of the slurrying medium, such as isopropanol, to the process. Without placing any limitation upon the invention, it is theorized that the failure of oxidizing agents to be effective in prior art slurry procedures is attributable to its rapid rate of reaction with the slurrying medium. This invention is designed to permit adequate reaction between the alkali cellulose and oxidizing agent and to minimize or eliminate the reaction between the oxidizing agent and slurrying medium.

The following examples are illustrative of the invention. In these examples all parts are in parts by weight unless otherwise indicated.

*Example 1*

To 552 parts of 87% isopropanol was added 23 parts of flake sodium hydroxide. The mixture was agitated until the sodium hydroxide was dissolved, allowed to stand until separation of liquid layers was complete, and the caustic-rich layer was separated. This layer analyzed 33% sodium hydroxide. This caustic layer was heated for 2 hours at 95°–100° C. to remove dissolved isopropanol and cooled to room temperature. Then 17.5 parts of 6% available chlorine sodium hypochlorite solution was added to the caustic layer.

Thirty-five parts of comminuted wood pulp was added to a batch mixer with agitator arms designed to impart a fluffing action to the cellulose. The caustic-hypochlorite mixture was then sprayed onto the agitated cellulose over a period of about 1 hour. Agitation of the alkali cellulose was then continued for 1 hour.

The alkali cellulose was added to the isopropanol-rich layer resulting from the caustic alcohol separation and agitated for 45 minutes. Then 24.5 parts of monochloroacetic acid was added, the temperature raised to 70° C., and held at this temperature for 2½ hours.

The resulting sodium carboxymethylcellulose slurry was neutralized, washed free from reaction salts with methanol, and dried. The product was a white fluffy powder. A 2% solution in water was measured to have a viscosity of 18 c. p. c., and a solution color of 1.0 when compared with a set of standard colors. On this scale, a color of 0.5 is best, and the color property becomes poorer as the numerical index increases.

*Example 2*

To 554 parts of 85% isopropanol was added 23 9/16 parts of flake sodium hydroxide. The mixture was agitated until the sodium hydroxide was dissolved and allowed to stand until separation of layers was complete.

The caustic-rich layer was separated. This layer analyzed 34% sodium hydroxide.

Thirty parts of comminuted wood pulp was added to a continuous mixer which imparted a high degree of fluffing action by a series of agitator arms. The caustic was sprayed at 10°–20° C. onto the agitated wood pulp through spray nozzles over a 15-minute period while the wood pulp passed through the mixer. Then $11^{11}/_{16}$ parts of 6% available chlorine hypochlorite solution was sprayed onto the agitated alkali cellulose during 15 minutes. The alkali cellulose was then aged an additional 60 minutes.

The alkali cellulose was added to the isopropanol-rich layer resulting from the caustic-alcohol separation and the mixture agitated for 90 minutes. Then 24.5 parts of monochloroacetic acid was added, the temperature raised to 70° C., and held at this temperature for 2½ hours.

The resulting sodium carboxymethylcellulose slurry was neutralized, washed free from reaction salts with methanol and dried. The product was a white fluffy powder. A 2% solution in water was measured to have a viscosity of 47 cps. The solution color was 1.0.

*Example 3*

Caustic was obtained by separation and sprayed on wood pulp cellulose as indicated in Example 1, with the exception that the caustic was not heated to remove isopropanol. To the alkali cellulose being agitated was added sufficient gaseous chlorine over a 60-minute period to give 3% chlorine based on the cellulose. Agitation was then continued for 2¼ hours.

The alkali cellulose was then added to the isopropanol layer, etherified, purified and dried as in the previous examples. The product was a white, fibrous fluffy powder. The viscosity of a 2% solution of the resulting sodium carboxymethylcellulose in water was 31 cps. The solution color was 2.0.

The present invention involves a novel slurry procedure for producing cellulose ethers wherein the viscosity of the cellulose derivative is regulated by addition of an oxidizing agent to the reaction mixture prior to the addition of the slurrying medium. For example, the invention can be applied to the production of cellulose ethers such as ethyl cellulose, propyl cellulose, benzyl cellulose, and the like, and to the control of the viscosity of such cellulose ethers during their production. However, such cellulose ethers are generally not produced by a slurry procedure, and in its preferred form this invention is particularly applicable to slurry processes for the production of cellulose derivatives. Among the cellulose derivatives that can be produced by a slurry process are the hydroxyalkyl cellulose derivatives, such as hydroxyethyl cellulose; the carboxyalkyl hydroxyalkyl cellulose derivatives, such as carboxymethyl hydroxyethyl cellulose; the sulfoalkyl cellulose derivatives, such as sulfoethyl cellulose, and the carboxyalkyl cellulose derivatives. The latter ether derivatives are the preferred products of this invention, and typical examples of these cellulose derivatives are carboxymethylcellulose, carboxyethyl cellulose, carboxypropyl cellulose, carboxybutyl cellulose and substituted variations in the alkyl group of the aforementioned ethers. The primary reaction product of the process is usually an alkali metal salt of the carboxyalkyl cellulose since the reaction is carried out in a strongly alkaline solution. The free acid is, in each case, readily obtained by treating the primary product with a mineral acid. Other salts can be readily prepared from the free acid form.

As previously indicated, the invention is preferably employed in the production of carboxyalkyl cellulose ethers by a slurry procedure. The foregoing examples describe in detail specific procedures for producing carboxymethylcellulose, and in its most preferred form the invention is employed for producing carboxymethylcellulose. The details of the invention will be set forth hereinafter by describing a method for producing carboxymethylcellulose using sodium hypochlorite as the oxidizing agent, but it will be realized by those skilled in the art that the invention can be similarly employed for producing other cellulose ethers, such as those mentioned above, using other oxidizing agents.

The unique character of the invention is quite evident when we consider the manner in which it can be incorporated into a procedure for producing carboxymethylcellulose or other cellulose ether by a slurry procedure. In such a procedure the alkali employed is quite frequently sodium hydroxide, and the inert slurrying medium frequently is isopropanol. The sodium hydroxide can be obtained in flake form or it may be in a highly concentrated aqueous solution, and it is often necesary to dilute the sodium hydroxide with water for use in the process. Also, the isopropanol is ordinarily employed at concentrations higher than the 87% solution or azeotropic mixture with water that is available commercially. In order to obtain the desired concentrations of sodium hydroxide and isopropanol, the two commerical products are mixed and the immiscible caustic layer separates from the isopropanol layer on standing. However, the caustic layer will contain some isopropanol as an impurity in a concentration as high as 0.5%, or higher. In the slurry procedures employed heretofore, the caustic layer containing isopropanol as an impurity and the isopropanol layer, after suitable separation, were then employed in the slurry process. In slurry procedures employed prior to this invention, it was generally considered that a hypochlorite could not be employed to control the viscosity of the cellulose derivative. It appears that the ineffectiveness of the hypochlorite was caused by its reactivity with the isopropanol or other similar slurrying medium. In accordance with this invention, the hypochlorite is used to control the viscosity of the cellulose derivative, but it is necessary that the hypochlorite be added to the reaction mixture at a time prior to the introduction of the isopropanol or other slurrying medium. The hypochlorite must be added to the process prior to the addition of the isopropanol that is used to form the slurry but not necessarily prior to the addition of any isopropanol that may be present in the sodium hydroxide as an impurity. If the sodium hydroxide contains isopropanol or other similar impurity, the hypochlorite should not be allowed to remain in contact with the sodium hydroxide for a substantial period of time prior to contacting with the cellulose unless the sodium hydroxide is heated for a sufficient period of time to remove the isopropanol or other similar impurities. If such a precaution is not exercised, the isopropanol or other similar impurity in the sodium hydroxide will tend to destroy the effectiveness of the hypochlorite when it is added to the reaction mixture.

In preparing a cellulose ether, such as carboxymethylcellulose, by a slurry process, the etherification reaction mixture will generally contain cellulose, alkali, water, etherifying agent and an inert diluent. In accordance with this invention, a hypochlorite is also incorporated in the reaction mixture, but it is essential that the hypochlorite is added to the reaction mixture prior to the addition of the inert diluent. The cellulose that is used in many instances is of a high degree of purity, and cotton linters can be used since they are usually available in readily etherifiable condition and are a highly purified form of cellulose. However, other cellulosic materials can be employed, such as purified wood pulps, preferably containing a high percentage of $\alpha$-cellulose, and for certain purposes comminuted wood, such as wood flour, sawdust, etc., can be used. The invention is particularly adaptable to slurry procedures employing wood pulp as the cellulosic material.

The etherification agent quite frequently employed in preparing carboxymethylcellulose is chloracetic acid. However, other halogenated lower fatty acids, such as chloropropropionic acid, chlorbutyric acid and the salts thereof with sodium, potassium and the like, can be used. The corresponding bromine and iodine compounds are also suitable. The etherification agent may be added as the free acid or as a salt, due allowance being made for the consumption or lack of consumption of alkali already present. The quantity of etherifying agent will be varied with the substitution desired in the cellulose derivative which is the product of the process. In general, the quantity of etherifying agent will be between about 0.01 and about 3 parts per part of cellulose. The proportion of etherifying agent to free alkali present may also be an important factor in determining the degree of substitution of the final product. In most cases, it is preferable to have present about 0.5 mole to about 1 mole of etherifying agent per mole of free alkali.

The alkali employed will usually be sodium hydroxide, although any of the strong alkali hydroxides are suitable. When the etherifying agent is added in the form of the free acid, sufficient alkali must be provided for neutralization of the acid above and beyond that required for effecting the etherification reaction. The amount and concentration of alkali with respect to water are factors which govern the final degree of substitution of the product. Any amount of alkali can be used as long as a product insoluble in the reaction medium is obtained. Ordinarily, the ratio of sodium hydroxide to cellulose varies from about 0.1 to about 2 parts per part of cellulose. The ratio of sodium hydroxide to water usually varies from about 0.02 to about 1 part of sodium hydroxide per part of water. These ratios refer to free alkali above that consumed in neutralizing acid etherification reagents. It is often desirable to spray the alkali onto the cellulose, and to permit spraying at ordinary temperatures (10°–40° C.) alkali of no more than about 30% strength is used. This strength is conveniently obtained by mixing 50–100% alkali with an azeotropic mixture of isopropanol and water and then separating the resulting layers.

Among the oxidizing agents that can be used are hypohalites, such as the alkali metal hypobromites, hypochlorites and hypoiodites, peroxides, such as hydrogen peroxide and the alkali metal peroxides and periodates, such as the alkali metal periodates.

The inert diluent should have the property of substantial inertness toward the reactants combined with the ability to take up water from the other reactants while at the same time being a nonsolvent for the reaction product. The lower aliphatic alcohols are quite suitable as inert diluents for the process, and the preferred diluents for a slurry procedure are isopropanol and tertiary butyl alcohol. Generally, they are used in minimum quantities sufficient to prevent the product from going into solution in the reaction medium. Frequently, larger quantities of the inert diluent will be used in order to provide for free agitation of the reaction mixture. Satisfactory ratios vary from 5 parts to 50 parts of diluent for each part of cellulose. Preferred ratios are within the range of 15 to 30 parts of diluent per part of cellulose.

The hypochlorites, which are preferred for this invention, are generally the inorganic hypochlorites. Metal hypochlorites, such as the alkali metal and alkaline earth metal hypochlorites, are ordinarily used, but other inorganic hypochlorites, such as ammonium hypochlorite, can be used, if desired. The preferred hypochlorite for the invention is sodium hypochlorite primarily because of its commercial availability. The amount of hypochlorite that is used in this process is dependent upon the desired viscosity of the final product, and it can be expressed in terms of the available chlorine content. The amount of hypochlorite that is used is sufficient to provide from 0.1% to 6% available chlorine based upon the cellulose employed. The hypochlorite can be incorporated in the reaction mixture by various methods, but it will be understood, of course, that the hypochlorite will be incorporated in the reaction mixture prior to the addition of the inert diluent or slurrying medium. One method of adding the hypochlorite involves the incorporation of the hypochlorite in the sodium hydroxide or other caustic, and the resulting mixture is then sprayed onto the cellulose. However, when this procedure is employed, the caustic is heated for a sufficient period of time to remove any isopropanol or other similar impurities therefrom prior to incorporation of the hypochlorite in the caustic. Another method involves the formation of the hypochlorite in situ. When this procedure is used, gaseous chlorine is passed into or through the cellulose onto which has been sprayed the alkali containing any isopropanol as an impurity, and the hypochlorite is formed by interaction of the chlorine and alkali. A preferred method of incorporation of the hypochlorite makes use of the procedure of spraying the hypochlorite onto the alkali cellulose which has been produced by the interaction of cellulose and caustic. In this procedure, the caustic that is used to react with the cellulose may contain isopropanol or other similar impurities, but the isopropanol or other impurity does not adversely affect the action of the hypochlorite. Another preferred procedure involves the spraying of caustic and any isopropanol or other similar impurity onto the cellulose. Immediately prior to the time that the caustic is sprayed onto the cellulose, the hypochlorite is added to the stream of caustic. However, it will be understood that the caustic containing the isopropanol or other impurity and the hypochlorite are in contact with each other only for a relatively short period of time prior to the spraying of the mixture onto the cellulose. As an alternative to the latter procedure, the hypochlorite and the caustic containing any isopropanol or other impurity can be simultaneously sprayed in separate streams onto the cellulose. It will be appreciated from the above-described procedures that the hypochlorite is not permitted to remain in contact with the isopropanol for any substantial period of time prior to the incorporation of the hypochlorite in the reaction mixture.

The alkali cellulose formed by any of the above procedures is permitted to age for a period not in excess of about 24 hours depending upon the viscosity desired in the final product. Then the alkali cellulose is slurried in isopropanol or other slurrying medium, and the etherification agent is added to the slurry. The reaction mixture is preferably agitated until the desired etherification reaction has been completed. Usually, the mixture is heated to a temperature within the range of about 25° to 100° C. to hasten the reaction. The reaction time varies from about 2 hours to about 24 hours, and at temperatures within the range of 50° to 75° C. a reaction time of 2 to 6 hours is usually sufficient.

The product can be recovered by draining off or otherwise removing reaction medium, purifying the product in a nonsolvent, such as methanol to leach out by-products, and, at the same time, neutralizing free alkali with acetic acid, draining off the mixture, washing with additional methanol and drying. The product is in fibrous form and has the desired viscosity characteristics as determined by the quantity of hypochlorite employed.

It is apparent that this invention provides an effective and efficient means for producing cellulose derivatives of low or medium viscosity by a slurry procedure. The viscosity of the final product will depend upon the amount of oxidizing agent, such as sodium hypochlorite, that is employed. Also, in accordance with this invention it is possible to produce a product of markedly improved color characteristics. It should be noted that in the specific examples the products had a color rating of either 1.0 or 2.0 which is an excellent and desirable property.

This invention is useful in the preparation of cellulose ethers, and it is an improvement over prior art procedures for the production of such ethers since close control of the viscosity of the ether is obtained and since products of improved color properties are obtained. From the foregoing detailed description of the invention, numerous

What we claim and desire to protect by Letters Patent is:

1. In the preparation of a cellulose ether in a reaction mixture comprising cellulose, alkali, etherifying agent and slurrying medium, the improvement which comprises regulating the viscosity of the cellulose ether by introducing into the reaction mixture an oxidizing agent selected from the group consisting of hypohalites, peroxides and periodates prior to the introduction to the reaction mixture of said slurrying medium.

2. In the preparation of a cellulose ether in a reaction mixture comprising cellulose, alkali, etherifying agent and slurrying medium, the improvement which comprises regulating the viscosity of the cellulose ether by introducing into the reaction mixture a peroxide prior to the introduction to the reaction mixture of said slurrying medium.

3. In the preparation of a cellulose ether in a reaction mixture comprising cellulose, alkali, etherifying agent and slurrying medium, the improvement which comprises regulating the viscosity of the cellulose ether by introducing into the reaction mixture a periodate prior to the introduction of the reaction mixture of said slurrying medium.

4. In the preparation of a cellulose ether in a reaction mixture comprising cellulose, alkali, etherifying agent and slurrying medium, the improvement which comprises regulating the viscosity of the cellulose ether by introducing into the reaction mixture a hypohalite prior to the introduction to the reaction mixture of said slurrying medium.

5. In the preparation of a carboxyalkyl cellulose ether in a reaction mixture comprising cellulose, alkali, carboxyalkylating agent and a lower aliphatic alcohol as a slurrying medium, the improvement which comprises regulating the viscosity of the carboxyalkyl cellulose ether by introducing into the reaction mixture an alkali metal hypochlorite prior to the introduction to the reaction mixture of said lower aliphatic alcohol slurrying medium.

6. In the preparation of carboxymethylcellulose in a reaction mixture comprising cellulose, sodium hydroxide, monochloracetic acid and isopropanol as a slurrying medium, the improvement which comprises regulating the viscosity of the carboxymethylcellulose by introducing into the reaction mixture sodium hypochlorite prior to the introduction to the reaction mixture of said isopropanol slurrying medium.

7. The method of producing and regulating the viscosity of a cellulose ether by a slurry process which comprises forming a reaction mixture of cellulose and an aqueous alkali solution, introducing to said reaction mixture a hypochlorite, subsequently forming a slurry of the resulting mixture containing alkali cellulose in a lower aliphatic alcohol, and reacting alkali cellulose in said alcohol slurrying medium with an etherifying agent.

8. The method of producing and regulating the viscosity of a carboxyalkyl cellulose by a slurry process which comprises forming a reaction mixture of cellulose and an aqueous alkali solution, introducing to said reaction mixture an alkali metal hypochlorite, subsequently forming a slurry of the resulting mixture containing alkali cellulose in a lower aliphatic alcohol, and reacting alkali cellulose in said alcohol slurrying medium with a carboxyalkylating agent.

9. The method of producing and regulating the viscosity of carboxymethylcellulose by a slurry process which comprises forming a reaction mixture of cellulose and an aqueous sodium hydroxide solution, introducing sodium hypochlorite to said reaction mixture, subsequently forming a slurry of resulting mixture containing sodium cellulose in ispropanol, and reacting sodium cellulose in said isopropanol slurrying medium with monochloracetic acid.

10. The method of producing and regulating the viscosity of carboxymethylcellulose by a slurry process which comprises admixing sodium hydroxide in a concentration of 50% to 100% in water and isopropanol in a concentration of about 87% in water, recovering separate layers from the admixture containing the first layer an aqueous sodium hydroxide solution of less than 50% concentration with isopropanol as an impurity and containing in the second layer isopropanol in a concentration higher than 87% in water, forming a reaction mixture with at least a portion of said first layer and cellulose, introducing sodium hypochlorite to said reaction mixture, subsequently forming a slurry of the resulting mixture containing sodium cellulose in at least a portion of said second layer containing isopropanol, and reacting sodium cellulose in the slurry thus formed with monochloracetic acid.

11. The method of producing and regulating the viscosity of carboxymethylcellulose by a slurry process which comprises admixing sodium hydroxide in a concentration of 50% to 100% in water and isopropanol in a concentration of about 87% in water, recovering separate layers from the admixture containing in the first layer an aqueous sodium hydroxide solution of less than 50% concentration with isopropanol as an impurity and containing in the second layer isopropanol in a concentration higher than 87% in water, mixing at least a portion of said first layer with sodium hypochlorite, immediately thereafter contacting resulting mixture with cellulose to form sodium cellulose, subsequently forming a slurry of the sodium cellulose-containing mixture in at least a portion of said second layer containing isopropanol, and reacting sodium cellulose in the slurry thus formed with monochloracetic acid.

12. The method of producing and regulating the viscosity of carboxymethylcellulose by a slurry process which comprises admixing sodium hydroxide in a concentration of 50% to 100% in water and isopropanol in a concentration of about 87% in water, recovering separate layers from the admixture containing in the first layer an aqueous sodium hydroxide solution of less than 50% concentration with isopropanol as an impurity and containing in the second layer isopropanol in a concentration higher than 87% in water, heating at least a portion of said first layer to remove isopropanol impurity therefrom, mixing sodium hypochlorite with resulting sodium hydroxide solution, contacting resulting mixture with cellulose to form sodium cellulose, subsequently forming a slurry of the sodium cellulose-containing mixture in at least a portion of said second layer containing isopropanol, and reacting sodium cellulose in the slurry thus formed with monochloreacetic acid.

13. The method of producing and regulating the viscosity of carboxymethylcellulose by a slurry process which comprises forming a reaction mixture of cellulose and an aqueous sodium hydroxide solution containing from 0.02 to 1 part of sodium hydroxide per part of water, said mixture containing from 0.1 to 2 parts of sodium hydroxide per part of cellulose, introducing sodium hypochlorite to said reaction mixture, subsequently forming a slurry of resulting mixture containing sodium cellulose in from 5 to 50 parts of isopropanol per part of cellulose in the initial reaction mixture, and reacting sodium cellulose in said isopropanol slurrying medium with from 0.01 to 3 parts of monochloreactic acid per part of cellulose in the initial reaction mixture.

References Cited in the file of this patent

UNITED STATES PATENTS

| | | |
|---|---|---|
| 2,033,125 | Baxter | Mar. 10, 1936 |
| 2,129,719 | Vincent | Sept. 13, 1938 |
| 2,180,517 | Goff | Nov. 21, 1939 |
| 2,512,338 | Klug | June 20, 1950 |
| 2,513,787 | Day | July 4, 1950 |
| 2,523,377 | Klug | Sept. 26, 1950 |